(12) United States Patent
Staelin et al.

(10) Patent No.: US 8,482,625 B2
(45) Date of Patent: Jul. 9, 2013

(54) IMAGE NOISE ESTIMATION BASED ON COLOR CORRELATION

(75) Inventors: Carl Staelin, Haifa (IL); Hila Nachlieli, Haifa (IL); Ron Maurer, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 2313 days.

(21) Appl. No.: 11/280,097

(22) Filed: Nov. 16, 2005

(65) Prior Publication Data

US 2007/0109430 A1    May 17, 2007

(51) Int. Cl.
 *H04N 5/228* (2006.01)
(52) U.S. Cl.
 USPC ................. 348/222.1; 345/618

(58) Field of Classification Search
 USPC ................................................ 348/222.1
 See application file for complete search history.

(56) References Cited

U.S. PATENT DOCUMENTS

| | | | | |
|---|---|---|---|---|
| 5,956,432 | A * | 9/1999 | Ohta | 382/264 |
| 6,928,231 | B2 * | 8/2005 | Tajima | 386/46 |
| 7,426,312 | B2 * | 9/2008 | Dance et al. | 382/254 |
| 2002/0168101 | A1 * | 11/2002 | Woodall | 382/162 |

OTHER PUBLICATIONS

Hamosfakidis et al., Feb. 5, 2002, EURASIP Journal on Applied Signal Processing, pp. 595-600.*
David L. Donoho, "Desnoising by soft thresholding," Stanford University, Apr.1992.

* cited by examiner

*Primary Examiner* — Usman Khan

(57) ABSTRACT

Noise level estimation includes examining color correlation in a digital image.

30 Claims, 5 Drawing Sheets

IMAGE NOISE ESTIMATION BASED ON COLOR CORRELATION

BACKGROUND

Optical resolution of scanners and other image capture devices is continually being increased. Increasing the optical resolution allows more information to be captured. However, an increase in perceived noise can result.

Knowledge of noise levels can be useful in digital image processing. For instance, some denoising algorithms use a noise level estimate to adjust the aggressiveness of noise removal. If an estimate is too low, much noise will remain in the denoised image. If an estimate is too high, image features will be removed from the denoised image. Accurate noise estimation will produce better results.

Therefore, accurate noise level estimation is desirable. A noise level estimation that varies spatially is also desirable, especially for natural images and other images in which the perceived noise levels might be non-uniform.

SUMMARY

According to one aspect of the present invention, noise level estimation includes examining color correlation in a color digital image. Other aspects and advantages of the present invention will become apparent from the following detailed description, taken in conjunction with the accompanying drawings, illustrating by way of example the principles of the present invention.

DETAILED DESCRIPTION

Figure 1:
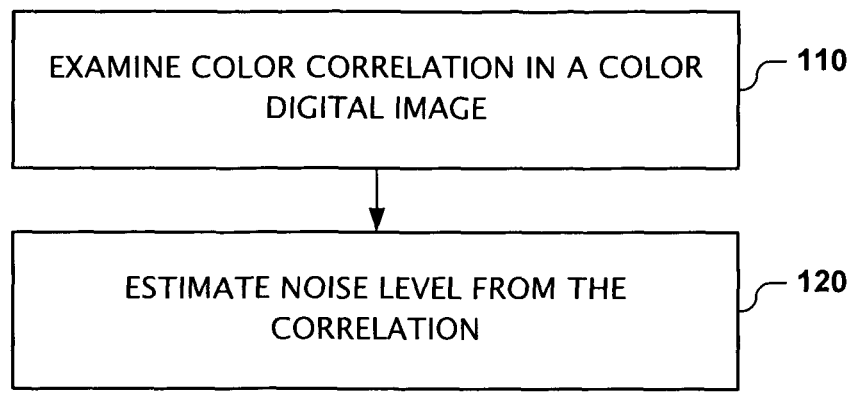
FIG. 1 is an illustration of noise level estimation in accordance with the present invention.

As shown in the drawings for the purpose of illustration, the present invention is embodied in noise level estimation based on color information in a digital image. In a natural image it is assumed that certain difference measures (e.g., directional derivatives) of the color channels are correlated, and that the degree of correlation is inversely related to noise level. The correlation is much higher in a noise-free image than in an image containing appreciable noise. Noise level estimation according to the present invention is based on this assumption (prior).

Figure 2A:
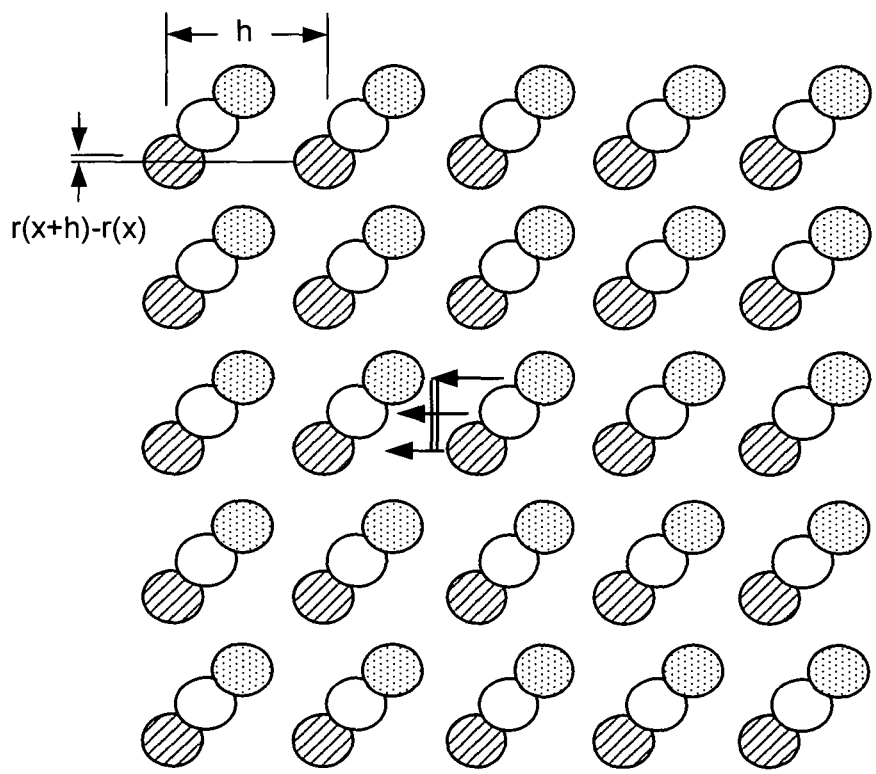
FIGS. 2a and 2b are illustrations of assumptions about color correlation with respect to noise level in a digital image.

Reference is made to FIG. 2a, which illustrates this prior for a noise-free RGB image (red components are represented by cross-hatched circles, blue components by dotted circles, and green components by open circles). A directional derivative for a red pixel is shown in FIG. 2a. The directional derivative may be computed as rise over run, where the run (h) is the distance between two pixels in the direction indicated by the arrows, and the rise (r(x+h)−r(x)) is the difference between the two pixels in the orthogonal direction. Directional derivatives for the different color channels at a single pixel are highly correlated, and should be the same (as illustrated by the arrows). Therefore, it is assumed that the correlation is reduced as the noise level is increased.

This illustration shows correlation only in a single direction. As discussed below, the prior is not limited to a single direction.

Reference is made to FIG. 1. Noise level estimation according to the present invention includes examining color correlation in a color digital image (block 110). The color correlation may be examined by comparing the agreement between local difference measures of different color channels. The local difference measures include, without limitation, gradients, derivatives, and norms to the derivatives. Examples of norms include Langwitch gradients, and Minkowski norms ("Lp"). The noise level may be estimated from this agreement (block 120).

Figure 3A:
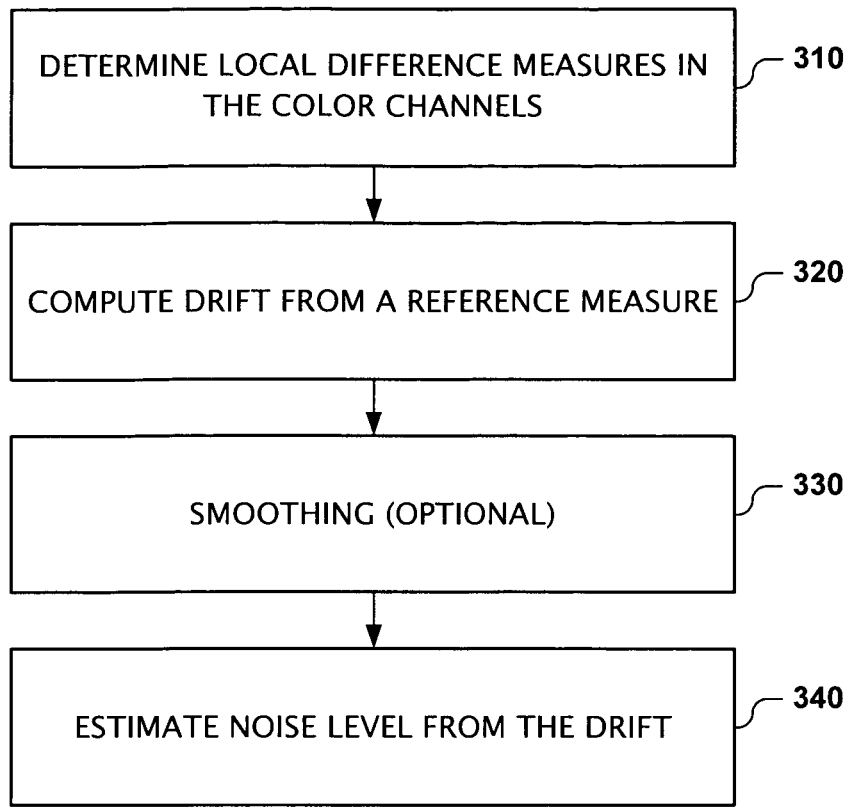
FIGS. 3a-3b are illustrations of a method in accordance with an embodiment of the present invention.
Figure 3B:
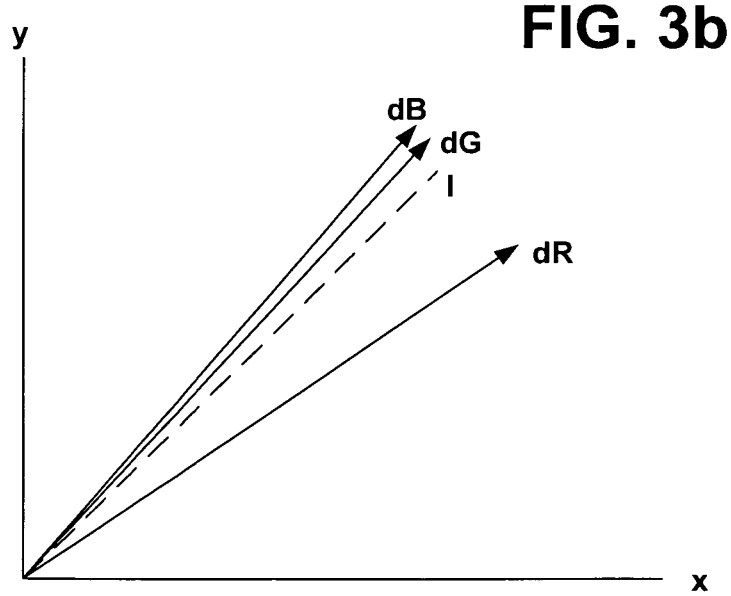

FIGS. 3a and 3b illustrate a method of using color gradients to estimate noise level in a color digital image. Color channels of the digital image are independent. Preferably, the digital image is not pre-processed by a lossy process e.g. JPEG compression or some other processing that destroys independence of the color channels.

The digital image may be fully sampled or undersampled. A fully sampled image has full color information (e.g., red, green and blue) at each pixel, whereas an undersampled image (e.g., a mosaic image) contains partial full color information (e.g., red or green or blue) at each pixel.

The method of FIG. 3a may be performed on each pixel. Performing the method of FIG. 3a on each pixel can produce a spatially varying estimate of noise level. An advantage of the spatially varying estimate is that it can be used to correct "hot spots" in the image sensor that captured the image. The method can be applied to all of the pixels in the image, or it can be applied to one or more groups of pixels in the image.

Referring to FIG. 3a, the method includes determining local difference measures in the color channels (block 310). Local difference measures for a pixel may be computed from a local neighborhood such as a 3×3 neighborhood or a 5×5 neighborhood (neighborhood size is a parameter).

The local difference measures may include derivatives. Derivatives may be computed for each pixel as follows:

$$\delta r = (r(x+h) - r(x))/h$$

$$\delta g = (g(x+h) - g(x))/h$$

$$\delta b = (b(x+h) - b(x))/h$$

where x is the pixel of interest (e.g., the center pixel in the neighborhood) and h is the distance. Adjacent pixels (i.e., pixels that are a distance of h=1 from the pixel of interest) may be used for scanned images. For demosaiced images the distance may be h=2, which is equivalent to down sampling once. Thus, each derivative may be computed as a function of the pixel of interest and one other pixel in the local neighborhood. All derivatives may be computed and then averaged. In the alternative, all derivatives may be computed, and then the derivative in the best direction is chosen. The "best" direction could be, for example, a direction that avoids color edges.

Drift is computed from a reference measure (block 320). In some embodiments, the reference measure may be computed as the mean of the three derivative ($\delta r + \delta g + \delta b$)/3. In other embodiments, the reference measure may be computed as the median of $\delta r$, $\delta g$ and $\delta b$. In other embodiments, the averages could be weighted, or non-linear combinations could be used.

FIG. 3b illustrates the correlation of the derivatives of red, green and blue channels for a pixel in a local neighborhood of a noisy image. The red, green and blue difference measures are denoted by dR, dG and dB.

Reference line (I) in FIG. 3b corresponds to the reference measure. The reference measure illustrated in FIG. 3b is referred to as the "identity line." In a noise free image, each local measure dR, dG and dB is assumed to coincide with the identity line.

The drift may be computed as the distance between the deviation of the local derivatives from the identity line. It is not necessary to compute the drift of all derivatives with respect to the reference measure. For instance, only two derivatives out of the three available in the RGB space may be used.

Computing the drifts in all directions for the pixels produces a Color Correlation Analysis ("CCA") map. The CCA map represents the distances of the color channel derivatives from their respective reference measures.

In a spatially varying estimate of noise levels, the local noise estimates may themselves be noisy. The CCA map can be smoothed to reduce fluctuations (block 330). For example, the map can be convolved with a Gaussian kernel.

The method of FIG. 3 further includes determining noise level from the drift (block 340). The noise level estimation (y) may be determined by the following linear computation:

$$y = a*x + b$$

where x is a map value, and a and b are pre-computed coefficients. In theory, $a = \sqrt{2/\pi}$ (approximately 0.564) and b=0.

However, the measure is not so limited. For example, the measure may be standard deviation or a biased standard deviation. In a biased standard deviation, the weights are not equal. Unlike the non-biased standard deviation, the biased standard deviation may use the distance between the norm of (δr−v, δg−v, δb−v), where v can be a weighted mean or a median or some other non-linear measure.

Optionally, to increase accuracy of the noise level estimate, pixels at edges color edges are ignored. The parameter v, which usually represents the mean derivative (δr−v, δg−v, δb−v), may be used to estimate an edge (though not necessarily a color edge). Higher local derivatives result in higher values for v, which suggest a higher likelihood of an edge.

Shifted derivatives may be used to increase the space for computing the drift. The space may be increased by using shifts in the +x direction, shifts in the −x direction, shifts in the +y direction, and shifts in the −y direction. Any two or more representatives may be sampled from those values. The derivatives (δr, δg, δb) and their neighboring derivatives, whether derivatives in the gray level image or in one of the color channels, are assumed to be correlated. Therefore, noise can be estimated from their dissimilarity.

For example, in a flat region, or a region which changes smoothly, (i.e. the second derivative is zero), the two derivatives dx0=(x2−x0) and dx1=(x3−x1) or dx0=(x1−x0) and dx1=(x2−x1) should be the same. More generally, in a 2-D image, the derivatives dli,j=(dli+1,j−dli,j) and dli,j+1=(dli+1,j+1−dli,j+1) should also be the same, so any variations from the identity line for {dli,j, dli,j+1, dli,j−1} should generally represent noise.

Although the prior of FIG. 2a and the method of FIGS. 3a-3b illustrate derivatives in a single direction, a method according to the present invention is not so limited. Higher order derivatives could be used. The actual number of directions will depend on the form of the derivative (e.g., first order versus second order versus a more general difference such as frequency band) and the distance over which the derivative is computed.

Figure 6:
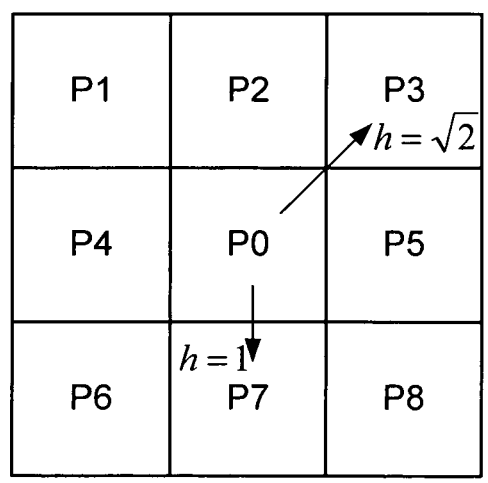
FIG. 6 is an illustration of a local pixel neighborhood.

Consider the pixel neighborhood illustrated in FIG. 6. A first order derivative can be calculated for the four nearest neighbors (P2, P4, P5 and P7) with a distance of h=1. The first order derivative may also include the four nearest neighbors (P1, P3, P6 and P8) with a distance of $h=\sqrt{2}$. The neighbors may be weighted. For example, if the first order derivative includes eight neighbors, the eight neighbors may be weighted according to distances.

The second order derivative may include the second-nearest neighbors in addition to the nearest neighbors. A total of sixteen directions can be used. A second order derivative (d2) may be computed as d2=p[x−h]+p[x+h]−2*p[x]), or, a high-pass filter can be used.

If the digital image is undersampled, the noise level estimate may be performed prior to demosaicing. Consider the example of a digital camera that generates an undersampled image with a Bayer color filter array. Each cell of 2×2 pixels in the undersampled image contains two pixels conveying green information, one pixel conveying red information, and one pixel conveying blue information. The four pixels of each cell can be binned, whereby each bin contains full color information. Noise level estimation can be performed on the pixel bins. As a result, noise level estimate is performed on an image that is less densely sampled.

Once the noise level estimate has been computed, the undersampled image is demosaiced.

In the alternative, the undersampled image may be demosaiced, and the noise level may be estimated from the demosaiced image.

Figure 4:
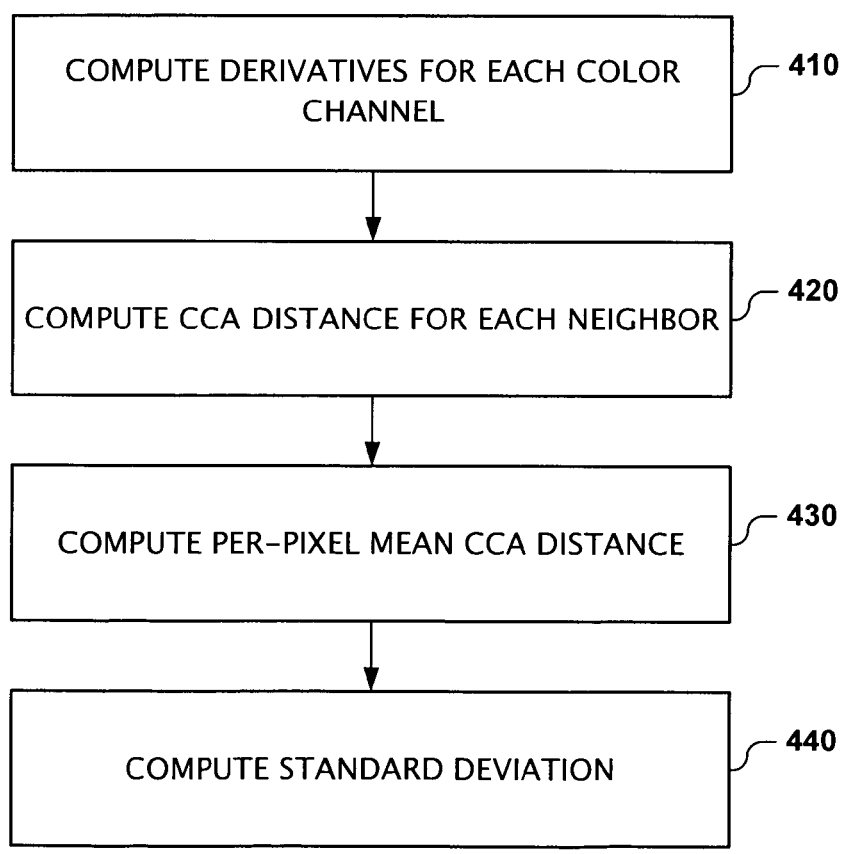
FIGS. 4-5 are illustrations of methods in accordance with other embodiments of the present invention.

Reference is now made to FIGS. 4 and 6, which illustrate a more specific example of estimating noise level for a given pixel of a fully sampled image in RGB space. The noise estimate is based on the given pixel's local neighborhood. For example, a 3×3 neighborhood may be used, with the given pixel P0 at the center of the neighborhood. The pixel of interest has eight neighbors P1-P8.

In this example, Gaussian noise is assumed in all three color channels. Noise level will be estimated from the norm of the distance.

At block 410, derivatives are computed for each color channel. The derivatives may be computed as δr=(r(x+h)−r(x))/h, δg=(g(x+h)−g(x))/h, and δb=(b(x+h)−b(x))/h, were x is the pixel in the central and h indicates the direction to one of the eight neighbors. The derivatives are computed in each direction. Resulting are three sets for each pixel, one set for each color channel. Each set includes derivatives in the different directions.

At block 420, a CCA distance ($D_{CCA}$) is computed for each neighbor in the local neighborhood. The CCA distance ($D_{CCA}$) may be computed as the distance between the deviation of the local derivatives $\delta\vec{u}=(\delta r, \delta g, \delta b)^T$ from the identity line $\hat{e}=(1,1,1)^T$:

$$D_{CCA} = \|\delta\vec{u} - \langle\delta\vec{u}, \hat{e}\rangle\hat{e}\|$$

where < > is the inner product and $$\hat{e} = \frac{\vec{e}}{\|\vec{e}\|}.$$

The CCA distance ($D_{CCA}$) is a norm of a vector having three components, one for each color channel.

At block 430, the per-pixel mean CCA distance is computed as the average of the CCA distance over the given pixel's neighbors. The averages are denoted by $D_{CCA}^r, D_{CCA}^g, D_{CCA}^b$.

Instead of using the average of the DCCA among the neighbors, the minimum DCCA among the neighbors may be used. Taking the minimal standard deviation of the different directional derivatives can reduce the impact of colored edges or texture, and increase the accuracy of both the global and local noise estimates.

At block 440, the standard deviation is computed from the average CCA distance. The following relation between DCCA and standard deviation ($\sigma$) may be used: $\sigma=0.564*E$ (Dcca).

Figure 5:
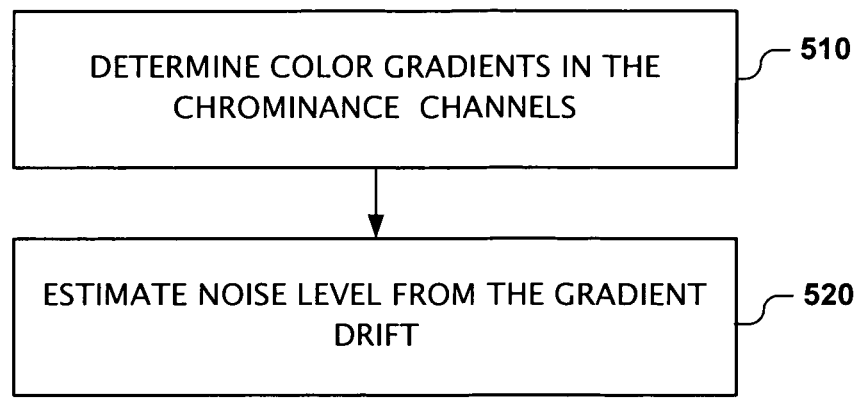

Reference is now made to FIG. 5, which illustrates a specific example of estimating noise level for an image in luminance-chrominance space. YCC space has two color channels and hence two color derivatives. Thus, gradients are computed for each color channel (block 510). Each gradient may be computed as a projection on the relevant chrominance axis. (In YCC space the distance vector is only on the surface of the chrominance components, since the luminance component Y has no color).

Each derivative is compared to zero instead of an identity line. Thus, each derivative provides a measure of drift. This is true also for RGB space. For YCC space, however, the use of this measure is simpler because it estimates the noise in the corresponding chrominance channel. Hence a "per color" noise estimate is obtained. The estimate for the luminance channel is also available, as the L2 norm of the drift information.

At block 520, noise level is computed from the drift. Smoothing may be performed on the neighborhood prior to computing the noise level. In some embodiments, the smoothing may be performed after the noise level has been computed.

The method is not limited to a color space having three components. For example, an image may be captured with a sensor array having four color channels (e.g., RGBI, where I is infrared) or six color channels (e.g., RGgBb, where g is light green and b is light blue). A derivative could be computed for each additional color channel, the additional derivatives could be used to compute the identity line, and the drift for each additional derivative could be computed.

A method according to the present invention is not limited to a noise level estimate that is spatially varying. A noise level estimate may be global (that is, a single estimate for an entire image). In some instances, the global estimate may be desirable, because it is simpler and faster to compute, because prior knowledge of the image indicates that the noise levels do not vary spatially, etc.

The global noise level estimate may be computed by taking the mean noise estimation in the image (mean over the CCA map, the mean value for the image). Thus, there is no need to calculate the noise estimation for each pixel. For example, the noise estimation can be computed for 10% of the pixels. Then a mean may be computed.

The noise level estimation is not limited to the prior illustrated in FIG. 2a. An alternative prior is illustrated in FIG. 2b.

Figure 2B:
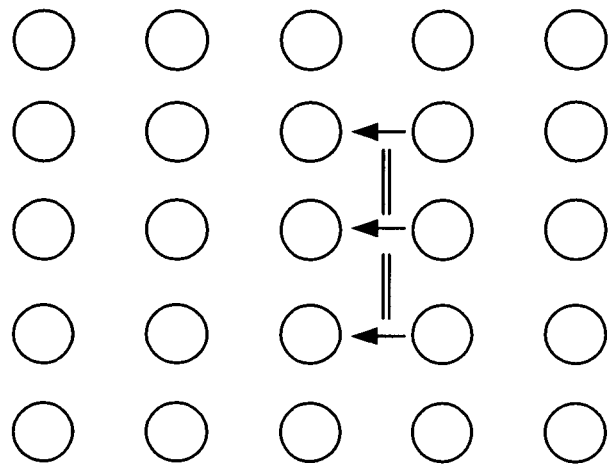

Reference is made to FIG. 2b, which illustrates the alternative prior. In a noise-free grayscale image, the directional derivatives at neighboring pixels are assumed to be highly correlated. For example, parallel neighboring derivatives are assumed to be correlated. The noise level can be estimated from their correlation or lack thereof.

This alternative prior may be used to estimate the noise level in grayscale images. However, this alternative prior may also be used to estimate the noise level in color images. The noise level estimation based on this alternative prior may be performed on to a single channel of a color image. As a first example, it may be performed on the luminance channel of a color image, on the green channel of an RGB image, etc. In practice, however, the prior illustrated in FIG. 2a is "stronger" and yields noise estimates with greater accuracy. As a second example, the prior of FIG. 2b may be combined with the prior of FIG. 2a to estimate the noise level in a color image.

The post-processing is not limited to any particular type. The post-processing may include one or more algorithms that use the estimated noise level. For example, such post-processing may include contrast enhancement, sharpening or denoising, or any combination of the three. Denoising may be performed with an algorithm that uses the estimated noise level to adjust the aggressiveness of noise removal. For example, a denoising filter disclosed in assignee's U.S. Ser. No. 10/919,671 ("Bi-selective filtering in transform domain") sets DCT coefficients below a lower threshold (L) to zero, and increases DCT coefficients above an upper threshold (H). Those coefficients are increased by a sharpening factor S. This filter may be modified to account for noise level by scaling coefficients of each by its corresponding noise estimate. The scaled coefficients are compared to the thresholds L and H.

As another example, denoising according to the present invention may be based on a wavelet-domain denoising algorithm described in an article titled "De-noising by soft-thresholding", IEEE Transactions on Information Theory, Vol 41, no 3, pp 613-627 May 1995 by Donoho. The algorithm uses a noise estimate to set the threshold of a transfer LUT. Values smaller than the threshold are set to zero, while values larger than the threshold have the threshold value subtracted from it. The threshold may be a function of the standard deviation of the noise (e.g. $2\sigma$). A global noise estimate may be used to globally control the threshold, or the threshold may be varied spatially over the image based on the local noise estimates. (Wavelet coefficients also have a spatial "location").

The noise level estimate can be used to set thresholds in the robust denoising bilateral filters disclosed in assignee's U.S. Pat. No. 6,665,448. The noise level estimate can be used to set thresholds in algorithms such as soft thresholding and hard thresholding. In general, the thresholds can be changed locally across the image.

Other types of processing may, be performed according to the present invention. In threshold-based algorithms, the noise level estimate can be used to adjust thresholds. In general, pixels are likely to contain noise if their differences are less than a threshold. Therefore, smoothing is performed to reduce noise. For differences greater than the threshold, pixels are likely to contain signal. Therefore, the pixels are either enhanced or not modified.

Knowledge of the image capture device and knowledge of the image being captured can be used to improve the noise level estimate, since a more accurate model of the image capture can be used.

Knowledge of the noise characteristics of an image capture device can improve the noise level estimate. If the noise is a mixture of Gaussian and shot noise, the shot noise can be detected or estimated and then removed from the image prior to estimating the noise level.

Noise other than Gaussian noise may be assumed. If noise having a Poisson distribution or a Laplacian distribution is assumed, only the resulting coefficients will change.

Knowledge of the target being imaged can also improve the accuracy of the estimate. Adding information about the channels can produce a better model or estimate of the signal and noise. Consider the example of scanning film negatives. Models for noise added by film (e.g., slides, negatives) can incorporate information such as luminance. In addition, a more detailed model of noise for a particular type of film could be created. For example, a film might have less grain in skin tones at a given luminance value than for another tone (e.g., blue) due to the chemistry of the film. The information about the target image may be obtained by capturing images of known targets (e.g., pantone color sheets) and measuring the resulting noise.

A method according to the present invention is not limited to any particular platform. The method can be performed by machines including, but not limited to, image capture machines (e.g., cameras, scanners, PDAs, cell phones), image processing machines, (e.g., computers, TiVo, printer drivers, etc.), and image rendering machines (printers, TVs, displays, etc.).

Figure 7:
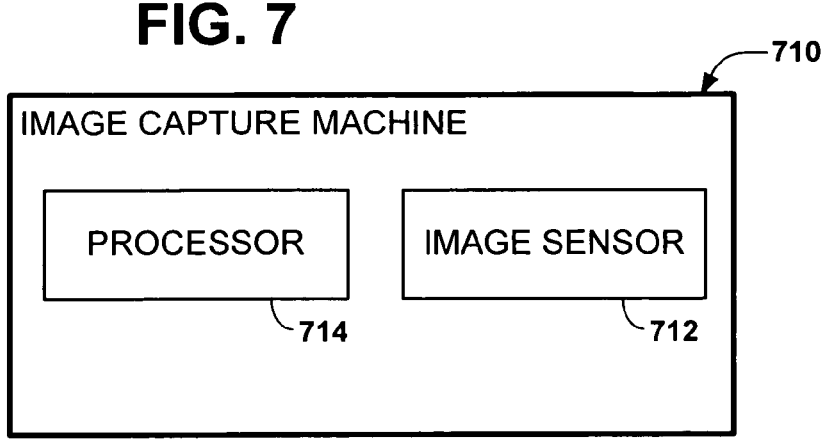
FIGS. 7-9 are illustrations of systems in accordance with embodiments of the present invention.

Reference is made to FIG. 7, which illustrates an image capture machine 710. The image capture machine 710 includes an image sensor 712, and a processor 714 (e.g., a digital signal processor, an ASIC) for estimating noise levels in images captured by the image sensor 712. The processor 714 may also perform noise level-based processing on the captured images (e.g., denoising according to noise level). The processor 714 may also perform other types of image processing that is not based on noise level (e.g., demosaicing, tone mapping).

Figure 8:
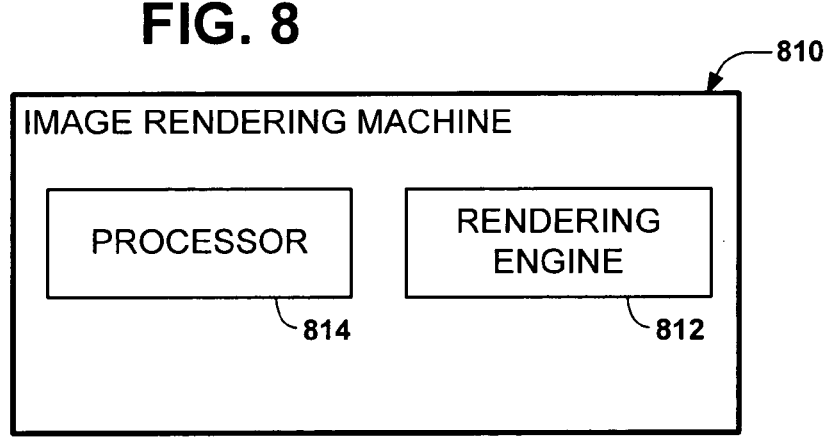

Reference is made to FIG. 8, which illustrates an image rendering machine 810. The image rendering machine includes an image rendering engine 812 (e.g., print engine), and a processor 814 (e.g., a digital signal processor, an ASIC) for receiving images and estimating noise level in the images. The processor 814 may perform noise level-based processing on the images to be rendered. The processor 814 may also convert (e.g., halftone) images to a format suitable for rendering by the rendering engine 812, and sends the converted images to the rendering engine 812. The processor 814 may perform other types of processing that are not based on noise level (e.g., JPEG decoding).

Figure 9:
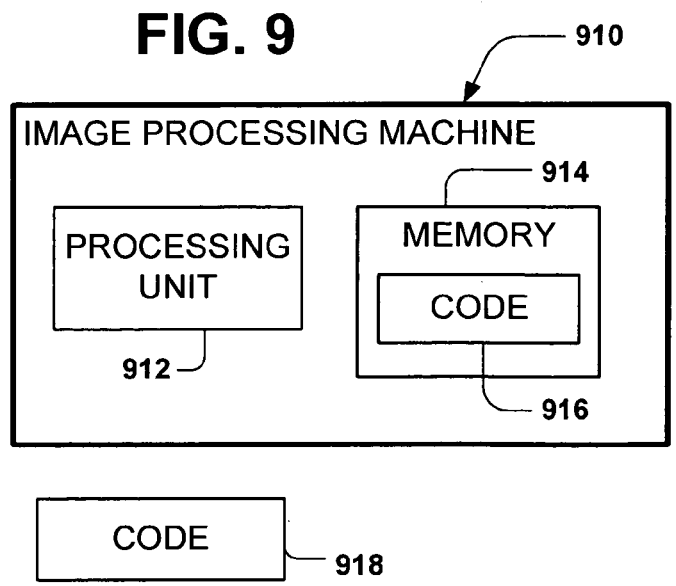

Reference is made to FIG. 9, which illustrates an image processing machine 910. An image processing machine 910 such as a computer includes a general purpose processing unit 912 and memory 914. The memory 914 stores code 916 that, when executed, causes the processing unit to estimate noise level. The code 916 can be a distributed as a standalone application, part of a larger program (e.g., an image editing program), a web browser plug-in, a function that is activated whenever a new image comes in (e.g., a \"hot folder\"), etc. The code 916 may be distributed to the computer via removable memory 918 such as an optical disk, via a network connection, etc.

Although several specific embodiments of the present invention have been described and illustrated, the present invention is not limited to the specific forms or arrangements of parts so described and illustrated. The present invention is construed according to the following claims.

The invention claimed is:

1. A method, comprising:
   for each of multiple given pixels of a color image having multiple color channels, determining a respective local difference measure value from a value of the given pixel and a respective value of at least one other pixel in a local neighborhood of the given pixel for each of multiple of the color channels;
   for each of the given pixels, ascertaining a respective color correlation value measuring deviation of the respective local difference measure values determined for the multiple color channels from a reference; and
   calculating a level of noise in the color image from one or more of the ascertained color correlation values;
   wherein the determining, the ascertaining, and the calculating are performed by a machine.

2. The method of claim 1, wherein the ascertaining comprises for each of the given pixels, ascertaining a deviation of a vector of the respective local difference measure values determined for the multiple color channels from a reference vector.

3. The method of claim 2, wherein, for each of the given pixels, the ascertaining of the deviation comprises ascertaining a distance between the vector of the respective local difference measure values and the reference vector.

4. The method of claim 3, wherein local difference measure values are derivatives between the value of the given pixel and the respective value of at least one other pixel in the local neighborhood of the given pixel for each of the color channels.

5. The method of claim 1, wherein the reference is computed from the local difference measure values.

6. The method of claim 1, wherein the reference is an identity line.

7. The method of claim 1, wherein for each of the given pixels, the ascertaining comprises ascertaining the respective color correlation value from a standard deviation of the local difference measure values from the reference.

8. The method of claim 1, wherein the determining is performed for each pixel of the color image.

9. The method of claim 1, further comprising smoothing the color correlation values to produce smoothed color correlation values, and wherein the level of noise in the color image is determined from the smoothed color correlation values.

10. The method of claim 1, wherein the determining is performed for less than all of the color channels of the color image.

11. The method of claim 1, wherein the color channels of the color image are in luminance-chrominance space, and the determining comprises for each of the given pixels, determining the respective local difference measure value from the value of the given pixel and the respective value of at least one other pixel in a local neighborhood of the given pixel in a chrominance color channel of the color image.

12. The method of claim 1, further comprising performing the determining in regions of the color image that avoids edges in the color image.

13. The method of claim 1, wherein the calculating comprises calculating noise level as a linear function of the one or more of the ascertained color correlation values.

14. The method of claim 1, wherein the calculating comprises calculating multiple levels of noise at different respective spatial locations across the color image from the ascertained color correlation values.

15. The method of claim 1, further comprising denoising the color image based on the calculated level of noise in the color image.

16. Apparatus comprising
   means for performing operations comprising
      for each of multiple given pixels of a color image having multiple color channels, determining a respective local different measure value from a value of the given pixel and a respective value of at least one other pixel in a local neighborhood of the given pixel for each of multiple of the color channels,
      for each of the given pixels, ascertaining a respective color correlation value measuring deviation of the respective local difference measure values determined for the multiple color channels and a reference, and calculating a level of noise in the color image from one or more of the ascertained color correlation values; and means for processing the image according to the calculated level of noise.

17. A machine, comprising:

a processing unit that performs operations comprising for each of multiple given pixels of a color image having multiple color channels, determining a respective local different measure value from a value of the given pixel and a respective value of at least one other pixel in a local neighborhood of the given pixel for each of multiple of the color channels, for each of the given pixels, ascertaining a respective color correlation value measuring deviation of the respective local difference measure values determined for the multiple color channels and a reference, and calculating a level of noise in the color image from one or more of the ascertained color correlation values.

18. The machine of claim 17, wherein the ascertaining comprises for each of the given pixels, ascertaining a deviation of a vector of the respective local difference measure values determined for the multiple color channels from a reference vector.

19. The machine of claim 18, wherein, for each of the given pixels, the ascertaining of the deviation comprises ascertaining a distance between the vector of the respective local difference measure values and the reference vector.

20. The machine of claim 19, wherein local difference measure values are derivatives between the value of the given pixel and the respective value of at least one other pixel in the local neighborhood of the given pixel for each of the color channels.

21. The machine of claim 17, wherein the reference is computed from the local difference measure values.

22. The machine of claim 17, wherein the noise level is calculated per pixel.

23. A non-transitory computer-readable medium storing machine-readable instructions which, when executed by a machine, cause the machine to perform operations comprising:

for each of multiple given pixels of a color image having multiple color channels, determining a respective local difference measure value from a value of the given pixel and a respective value of at least one other pixel in a local neighborhood of the given pixel for each of multiple of the color channels;

for each of the given pixels, ascertaining a respective color correlation value measuring deviation of the respective local difference measure values determined for the multiple color channels from a reference; and calculating a level of noise in the color image from one or more of the ascertained color correlation values.

24. The computer-readable medium of claim 23, wherein in the ascertaining the machine performs operations comprising for each of the given pixels, ascertaining a deviation of a vector of the respective local difference measure values determined for the multiple color channels from a reference vector.

25. The computer-readable medium of claim 24, wherein in the ascertaining of the deviation the machine performs operations comprising for each of the given pixels, ascertaining a distance between the vector of the respective local difference measure values and the reference vector.

26. The computer-readable medium of claim 25, wherein local difference measure values are derivatives between the value of the given pixel and the respective value of at least one other pixel in the local neighborhood of the given pixel for each of the color channels.

27. Apparatus, comprising a memory storing processor-readable instructions, a processor coupled to the memory, operable to execute the instructions, and based at least in part on the execution of the instructions operable to perform operations comprising for each of multiple given pixels of a color image having multiple color channels, determining a respective local difference measure value from a value of the given pixel and a respective value of at least one other pixel in a local neighborhood of the given pixel for each of multiple of the color channels;

for each of the given pixels, ascertaining a respective color correlation value measuring deviation of the respective local difference measure values determined for the multiple color channels from a reference; and calculating a level of noise in the color image from one or more of the ascertained color correlation values.

28. The apparatus of claim 27, wherein in the ascertaining the processor performs operations comprising for each of the given pixels, ascertaining a deviation of a vector of the respective local difference measure values determined for the multiple color channels from a reference vector.

29. The apparatus of claim 28, wherein in the ascertaining of the deviation the processor performs operations comprising for each of the given pixels, ascertaining a distance between the vector of the respective local difference measure values and the reference vector.

30. The apparatus of claim 29, wherein local difference measure values are derivatives between the value of the given pixel and the respective value of at least one other pixel in the local neighborhood of the given pixel for each of the color channels.

* * * * *